US006872342B2

(12) United States Patent
Giachetto et al.

(10) Patent No.: US 6,872,342 B2
(45) Date of Patent: Mar. 29, 2005

(54) EMBOSSING AND ADHESIVE PRINTING PROCESS

(75) Inventors: R. Matthew Giachetto, Loveland, OH (US); David Mark Sageser, Cincinnati, OH (US); Kenneth Stephen McGuire, Cincinnati, OH (US); Peter Worthington Hamilton, Cincinnati, OH (US); James Michael Archbold, West Chester, OH (US); Kevin Benson McNeil, Loveland, OH (US); Jeffrey Moss Vaughn, Cincinnati, OH (US); Timothy Jude Lorenz, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 308 days.

(21) Appl. No.: 10/161,351

(22) Filed: May 31, 2002

(65) Prior Publication Data

US 2002/0180097 A1 Dec. 5, 2002

Related U.S. Application Data

(63) Continuation-in-part of application No. 09/758,753, filed on Jan. 11, 2001, now Pat. No. 6,602,454, which is a continuation of application No. 09/289,222, filed on Apr. 9, 1999, now Pat. No. 6,193,918.

(51) Int. Cl.[7] ......................... B29C 47/06; B29C 59/04; B29C 71/00; B29C 71/02

(52) U.S. Cl. .................. 264/167; 156/209; 264/171.13; 264/234; 264/236; 264/237; 264/286

(58) Field of Search ............................ 264/167, 171.13, 264/234, 236, 237, 286; 156/209

(56) References Cited

U.S. PATENT DOCUMENTS

| | | | |
|---|---|---|---|
| 680,533 A | 8/1901 | Marinier et al. | |
| 690,822 A | 1/1902 | Avril | |

(List continued on next page.)

FOREIGN PATENT DOCUMENTS

| | | | |
|---|---|---|---|
| BE | 570960 A | 9/1958 | |
| EP | 0037101 A1 | 10/1981 | |
| EP | 0621082 A1 | 10/1994 | |
| EP | 0623332 A1 | 11/1994 | |
| FR | 1315903 A | 12/1962 | |
| FR | 1429312 A | 1/1966 | |
| GB | 975783 A | 11/1964 | |
| GB | 1069445 A | 5/1967 | |
| WO | WO 92/00187 A1 | 1/1992 | |
| WO | WO 95/11945 A1 | 5/1995 | |
| WO | WO 95/31225 A1 | 11/1995 | |
| WO | WO 96/31652 A1 | 10/1996 | |
| WO | WO 97/18276 A1 | 5/1997 | |

OTHER PUBLICATIONS

Translation of Japan 3–002,292 (Jan. 8, 1991).

(List continued on next page.)

*Primary Examiner*—Leo B. Tentoni
(74) *Attorney, Agent, or Firm*—Peter D. Meyer; David M. Weirich

(57) ABSTRACT

An embossing and adhesive application process including the steps of: applying an adhesive to a first patterned embossing roll which is engaged with a second patterned embossing roll having a complementary pattern to the first embossing roll; passing a web of sheet material between the first and second embossing rolls at a tangential line speed to simultaneously emboss the web and direct the adhesive against the web; and splitting the adhesive such that at least some of the adhesive remains on the first embossing roll and some of the adhesive remains on the web to form an adhesive pattern between embossments on the web.

19 Claims, 2 Drawing Sheets

U.S. PATENT DOCUMENTS

| | | | |
|---|---|---|---|
| 1,358,891 | A | 11/1920 | Steedman |
| 1,454,364 | A | 5/1923 | Winchenbaugh et al. |
| 2,054,313 | A | 9/1936 | Bright |
| 2,338,749 | A | 1/1944 | Wilbur |
| 2,681,612 | A | 6/1954 | Reiman |
| 2,838,416 | A | 6/1958 | Babiarz et al. |
| 2,855,844 | A | 10/1958 | Stewart |
| 2,861,006 | A | 11/1958 | Salditt |
| 3,018,015 | A | 1/1962 | Agriss et al. |
| 3,024,154 | A | 3/1962 | Singleton et al. |
| 3,312,005 | A | 4/1967 | McElroy |
| 3,386,846 | A | 6/1968 | Lones |
| 3,484,835 | A | 12/1969 | Trounstine et al. |
| 3,554,835 | A | 1/1971 | Morgan |
| 3,573,136 | A | 3/1971 | Gardner |
| 3,585,101 | A | 6/1971 | Stratton et al. |
| 3,592,722 | A | 7/1971 | Morgan |
| 3,708,366 | A | 1/1973 | Donnelly |
| 3,850,095 | A | 11/1974 | Snyder |
| 3,853,129 | A | 12/1974 | Kozak |
| 3,867,225 | A | 2/1975 | Nystrand |
| 3,879,330 | A | 4/1975 | Lustig |
| 3,901,237 | A | 8/1975 | Cepuritis et al. |
| 3,911,187 | A | 10/1975 | Raley |
| 3,937,221 | A | 2/1976 | Tritsch |
| 3,943,609 | A | 3/1976 | Egan, Jr. |
| 3,950,480 | A | 4/1976 | Adams et al. |
| 3,967,624 | A | 7/1976 | Milnamow |
| 4,023,570 | A | 5/1977 | Chinai et al. |
| 4,054,697 | A | 10/1977 | Reed et al. |
| 4,061,820 | A | 12/1977 | Magid et al. |
| 4,067,337 | A | 1/1978 | Ness |
| 4,133,152 | A | 1/1979 | Penrose |
| 4,181,752 | A | 1/1980 | Martens et al. |
| 4,273,889 | A | 6/1981 | Yamazaki et al. |
| 4,303,485 | A | 12/1981 | Levens |
| 4,325,768 | A | 4/1982 | Schulz |
| 4,336,804 | A | 6/1982 | Roeder |
| 4,337,772 | A | 7/1982 | Roeder |
| 4,339,088 | A | 7/1982 | Niedermeyer |
| 4,342,314 | A | 8/1982 | Radel et al. |
| 4,376,147 | A | 3/1983 | Byrne et al. |
| 4,376,440 | A | 3/1983 | Whitehead et al. |
| 4,392,897 | A | 7/1983 | Herrington |
| 4,397,905 | A | 8/1983 | Dettmer et al. |
| 4,404,242 | A | 9/1983 | Squier |
| 4,405,666 | A | 9/1983 | Squier |
| 4,410,130 | A | 10/1983 | Herrington |
| 4,413,109 | A | 11/1983 | Haas |
| 4,460,634 | A | 7/1984 | Hasegawa |
| 4,508,256 | A | 4/1985 | Radel et al. |
| 4,509,908 | A | 4/1985 | Mullane, Jr. |
| 4,514,345 | A | 4/1985 | Johnson et al. |
| 4,519,095 | A | 5/1985 | Clayton |
| 4,528,239 | A | 7/1985 | Trokhan |
| 4,543,142 | A | 9/1985 | Kuepper et al. |
| 4,546,029 | A | 10/1985 | Cancio et al. |
| 4,556,595 | A | 12/1985 | Ochi |
| 4,576,850 | A | 3/1986 | Martens |
| 4,578,069 | A | 3/1986 | Whitehead et al. |
| 4,587,152 | A | 5/1986 | Gleichenhagen et al. |
| 4,612,221 | A | 9/1986 | Biel et al. |
| 4,655,761 | A | 4/1987 | Grube et al. |
| 4,659,608 | A | 4/1987 | Schulz |
| 4,695,422 | A | 9/1987 | Curro et al. |
| 4,699,622 | A | 10/1987 | Toussant et al. |
| 4,743,242 | A | 5/1988 | Grube et al. |
| 4,778,644 | A | 10/1988 | Curro et al. |
| 4,803,032 | A | 2/1989 | Schulz |
| 4,820,589 | A | 4/1989 | Dobreski et al. |
| 4,839,216 | A | 6/1989 | Curro et al. |
| 4,894,275 | A | 1/1990 | Pelzer |
| 4,946,527 | A | 8/1990 | Battrell |
| 4,959,265 | A | 9/1990 | Wood et al. |
| 5,008,139 | A | 4/1991 | Ochi et al. |
| 5,080,957 | A | 1/1992 | Leseman et al. |
| 5,098,522 | A | 3/1992 | Smurkoski et al. |
| 5,112,674 | A | 5/1992 | German et al. |
| 5,116,677 | A | 5/1992 | Jones |
| 5,141,790 | A | 8/1992 | Calhoun et al. |
| 5,165,982 | A | 11/1992 | Gubitz et al. |
| D331,665 | S | 12/1992 | Underhill |
| 5,175,049 | A | 12/1992 | Huff et al. |
| 5,176,939 | A | 1/1993 | Shepherd |
| 5,208,096 | A | 5/1993 | Dohrer |
| 5,215,617 | A | 6/1993 | Grupe |
| 5,215,804 | A | 6/1993 | Hagens et al. |
| 5,221,276 | A | 6/1993 | Battrell |
| 5,245,025 | A | 9/1993 | Trokhan et al. |
| 5,246,762 | A | 9/1993 | Nakamura |
| 5,269,776 | A | 12/1993 | Lancaster et al. |
| 5,273,805 | A | 12/1993 | Calhoun et al. |
| 5,273,809 | A | 12/1993 | Simmons |
| 5,275,588 | A | 1/1994 | Matsumoto et al. |
| 5,296,277 | A | 3/1994 | Wilson et al. |
| 5,300,347 | A | 4/1994 | Underhill et al. |
| 5,310,587 | A | 5/1994 | Akahori et al. |
| 5,324,279 | A | 6/1994 | Lancaster et al. |
| 5,334,428 | A | 8/1994 | Dobreski et al. |
| 5,339,730 | A | 8/1994 | Ruppel et al. |
| 5,342,344 | A | 8/1994 | Lancaster et al. |
| 5,344,693 | A | 9/1994 | Sanders |
| 5,382,464 | A | 1/1995 | Ruppel et al. |
| 5,436,057 | A | 7/1995 | Schulz |
| 5,453,296 | A | 9/1995 | Lauritzen et al. |
| 5,458,938 | A | 10/1995 | Nygard et al. |
| 5,487,929 | A | 1/1996 | Rusincovitch, Jr. et al. |
| 5,514,122 | A | 5/1996 | Morris et al. |
| 5,518,801 | A | 5/1996 | Chappell et al. |
| 5,527,112 | A | 6/1996 | Dais et al. |
| D373,026 | S | 8/1996 | Delebreau et al. |
| 5,575,747 | A | 11/1996 | Dais et al. |
| 5,585,178 | A | 12/1996 | Calhoun et al. |
| 5,589,246 | A | 12/1996 | Calhoun et al. |
| 5,597,639 | A | 1/1997 | Schulz |
| 5,622,106 | A | 4/1997 | Rayner |
| D381,810 | S | 8/1997 | Schultz et al. |
| 5,662,758 | A | 9/1997 | Hamilton et al. |
| 5,686,168 | A | 11/1997 | Laurent et al. |
| 5,736,223 | A | 4/1998 | Laurent |
| 5,871,607 | A | 2/1999 | Hamilton et al. |

OTHER PUBLICATIONS

Abstract of Japan 7–246,216 (Sep. 26, 1995).

Abstract of Japan 2–303822 (Dec. 17, 1990).

Abstract of Japan 7–266526 (Oct. 17, 1995).

Martin Gardner– "Penrose Tiles to Trapdoor Ciphers", Chapter 1 Penrose Tiling, pp. 1–18; (Pub. Mathematical Assn. Of America—(1997).

Broughton, J., et al., "Porous Cellular Ceramic Membranes: A Stochastic Model To Describe the Structure of an Anodic Oxide Membrane", Journal of Membrane Science 106, pp. 89–101 (1995).

Lim, J.H.F., et al., "Statistical Models to Describe the Structure of Porous Ceramic Membranes", Separation Science and Technology, 28 (1–3), pp. 821–854 (1993).

Watson, D.F., "Computing the n–dimensional Delaunay Tessellation with Application to Voronoi Polytopes", The Computer Journal, vol. 24, No. 2, pp. 167–172 (1981).

EMBOSSING AND ADHESIVE PRINTING PROCESS

CROSS REFERENCE TO RELATED APPLICATIONS

This application is a continuation-in-part of commonly-assigned, U.S. patent application Ser. No. 09/758,753, filed Jan. 11, 2001, issued as U.S. Pat. No. 6,602,454, which is a continuation of U.S. patent application Ser. No. 09/289,222, filed Apr. 9, 1999, issued as U.S. Pat. No. 6,193,918.

FIELD OF THE INVENTION

The present invention relates to processes and equipment for embossing and applying adhesive to thin film webs and webs made by such processes.

BACKGROUND OF THE INVENTION

Sheet materials which include a thin layer of pressure-sensitive adhesive protected from inadvertent contact, as well as methods and apparatus for manufacturing them, have been developed and are described in detail in commonly-assigned U.S. Pat. No. 5,662,758, issued to Hamilton et al. entitled "Composite Material Releasably Sealable to a Target Surface When Pressed Thereagainst and Method of Making"; U.S. Pat. No. 5,871,607, issued to Hamilton et al. entitled "Material Having A Substance Protected by Deformable Standoffs and Method of Making", and U.S. Pat. No. 5,965,235 issued to McGuire, et al. entitled "Three-Dimensional, Nesting-Resistant Sheet Materials and Method and Apparatus for Making Same" and U.S. Pat. No. 6,194,062 issued to Hamilton et al. entitled "Improved Storage Wrap Materials". Such processes, however, tend to be relatively slow and not suitable for high speed commercial applications. Accordingly, alternative processes such as those described in U.S. Pat. No. 6,193,918 B1 issued to McGuire et al. entitled "High Speed Embossing and Adhesive Printing Process and Apparatus" have been developed to address the issues related to the speed of the process. In such processes, release coatings are used on some of the rolls in order to release the adhesive and web via peel, i.e. adhesive failure, when the web is stripped from the roll. Although such processes have been found to provide for increased line speeds, the use of a release substance on one or more rolls can limit the amount of time a line can run before being shut down for repair or replacement of the release coated rolls. In practice, release coatings typically do not provide release for extended periods of time due to wear or loss of release properties. The result is poor roll life requiring frequent replacement of the coated rolls.

Accordingly, it would be desirable to provide a process for manufacturing adhesively coated or printed webs that does not require the use of a release coating on the roll that transfers adhesive to the web and/or a method of extending the life of coated rolls. The present invention eliminates the need for a release coating by providing the adhesive at a temperature that results in "splitting" the adhesive by means of cohesive failure of the adhesive rather than via a peel mechanism or adhesive failure between the adhesive and the roll. The method of the present invention can also be used in conjunction with rolls including a release coating or surface to extend the life of the coating or surface.

All documents cited are, in relevant part, incorporated herein by reference; the citation of any document is not to be construed as an admission that it is prior art with respect to the present invention.

SUMMARY OF THE INVENTION

The present invention provides an embossing and adhesive application process including the steps of: applying an adhesive to a first patterned embossing roll which is engaged with a second patterned embossing roll having a complementary pattern to the first embossing roll; passing a web of sheet material between the first and second embossing rolls at a tangential line speed to simultaneously emboss the web and direct the adhesive against the web; and removing the web from the first patterned roll, wherein the adhesive cohesively fails and splits such that at least some of the adhesive remains on the first embossing roll and some of the adhesive remains on the web and forms an adhesive pattern between embossments on the web. In alternative embodiments, the web may be embossed at a different time and location from the adhesive application or may not be embossed at all.

In yet other embodiments, the present invention provides food storage wraps made by the process of the present invention, wherein the food wrap has adhesive disposed on at least one surface thereof. The food storage wrap may be two or three-dimensional and may include patterned or continuous adhesive on the surface.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify similar elements and wherein:

DETAILED DESCRIPTION OF THE INVENTION

Figure 1:
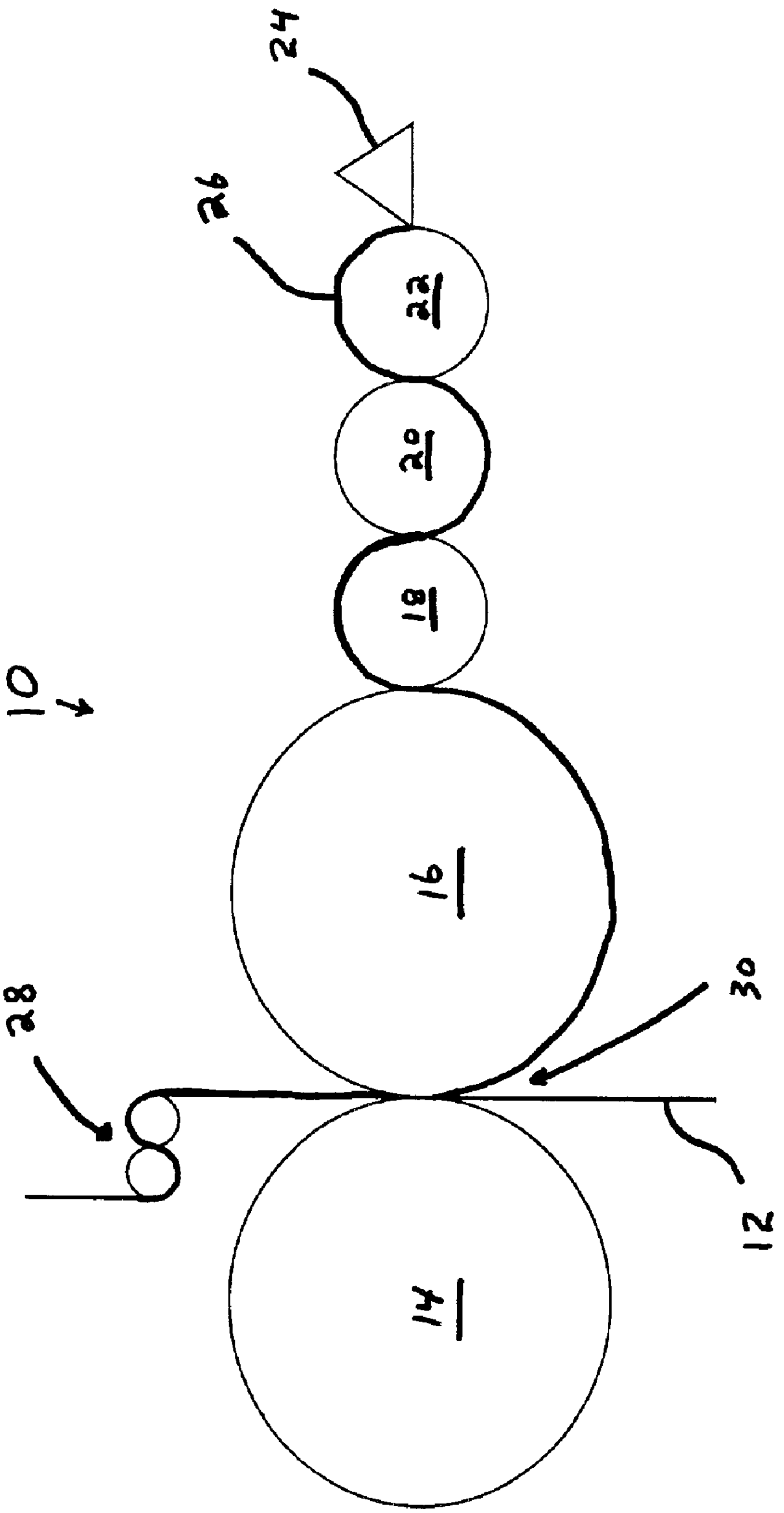
FIG. 1 is a schematic illustration of one embodiment of the process and apparatus according to the present invention. In this embodiment, embossing and glue application occur simultaneously.

FIG. 1 illustrates, in schematic form, one embodiment of the process and apparatus 10 of the present invention. The apparatus preferably includes at least two mated embossing rolls 14 and 16. (However, embodiments are contemplated wherein the web is not embossed or is not embossed by means of mated embossing rolls.) The apparatus 10 may be operatively associated with other equipment, such as a heated slot die, such as slot die 24, glue metering rolls, such as rolls 18–22, and an S-wrap, such as s-wrap 28, all of which are also shown in FIG. 1, and any other desired equipment and/or processes. In the embodiment shown in FIG. 1, web 12 is embossed by engaging embossing rolls 14 and 16 and passing the web 12 between the embossing rolls 14 and 16. In other embodiments, the web 12 may be placed in contact with one or more rolls or other structures for applying adhesive to the web and/or embossing the web. The web 12 may be any material to which an adhesive may be applied and preferably, which may be embossed. For example, the web 12 may include, but is not limited to, paper, films (including but not limited to polymeric films), wovens, nonwovens, laminates, foils, wax paper or other coated papers and combinations thereof.

The embossing rolls 14 and 16 preferably have complementary embossing patterns that interlock to emboss the web 12 of sheet material passed therebetween. A roll with pockets and raised lands is generally referred to as a female embossing roll while a roll with raised nubs and recessed lands is generally referred to as a male roll. In this embodiment, female embossing roll 16 is also used to simultaneously apply glue 26 (or adhesive) to the web 12 such that the adhesive 26 forms an adhesive pattern between the embossments on the web 12. (However, alternative embodiments are contemplated wherein the adhesive is disposed in other than a pattern, e.g. continuously or randomly, and/or is located in regions other than between the embossments. Further, it is contemplated that the adhesive may be applied by means other than the female roll 16, such as, for example, by a sprayer, extruder, printer, permeable or impermeable rolls, brushes, pads, etc.) At least a portion of the adhesive 26 is maintained at a temperature or in a condition such that the adhesive 26 fails cohesively or "splits" when the web 12 is removed from the roll 16. As used herein, the terms "cohesive failure", "split" or "splitting" refer to failure of the adhesive internally. That is, the cohesive bond within the adhesive is weaker than the adhesive bond between the adhesive and the surfaces to which the adhesive is adhered. Thus, in this embodiment, the adhesive 26 splits and is disposed on both the roll 16 and the web 12 after the web 12 is removed from the roll 16.

While glue 26 may be applied to the female roll 16 by any application method known in the industry such as, for example, spraying, printing, extrusion, brushing, by means of permeable or impermeable rolls and/or pads, FIG. 1 shows one embodiment utilizing a slot die 24 and glue metering rolls 18–22. The glue metering rolls 18–22 can be of any size or material. In one embodiment, it has been found that the metering rolls 18–22 work well if alternated between plain steel and rubber-coated steel. With reference to the embodiment shown in FIG. 1, an adhesive 26 may be extruded onto the surface of a roll, such as roll 22 via a heated slot die, such as die 24. The slot die 24 may be any suitable slot die or other means for applying adhesive to the roll 22. The slot die 24 or other glue application means may be supplied by any suitable apparatus. For example, the slot die 24 may be supplied by a heated hopper and variable speed gear pump through a heated hose. The adhesive 26 is preferably extruded onto the surface of the roll 22 at a temperature that permits the adhesive 26 to at least partially transfer to any other rolls in the glue metering stack or the embossing roll 16, depending on the particular embodiment.

The adhesive 26 utilized may be any suitable adhesive, including, but not limited to hot melt adhesives, latex adhesives, adhesives that are soluble in water or other solvents, UV light curable adhesives and/or electron beam curable adhesives. With reference to the embodiment shown in FIG. 1, it may be preferred that the adhesive is at least somewhat elastic in nature, but this need not be the case. This is because a transition from the stationary slot die 24 to a rotating roll can result in the glue being extended and fractured, or in non-adhesion to the roll. To reduce the extension rate of the adhesive 26 in such embodiments, it is preferably applied first to a slow moving roll, such as roll 22, and then through a series of metering nips (the nips between metering rolls 18–22) where it is milled down to a very thin glue film and accelerated to the desired tangential line speed. In one embodiment, the surface speed of the first of the glue metering rolls 22 may be slower than the nominal tangential line speed of the web 12 of sheet material to be embossed and adhesive-coated. The remaining glue metering rolls 18–20 and the embossing roll 16 rotate progressively faster so that the glue application nip 30 (where the glue is transferred to the web 12), is surface speed matched with the speed of the web 12.

Although the glue rolls 18–22 may be heated or cooled to maintain any desired temperature, it has been found to be desirable to maintain at least a portion of the adhesive 26 above a temperature that provides for efficient transfer from roll to roll, as desired. The rolls, and thus the adhesive, may be heated or cooled by any known means, including internal or external heating and/or cooling devices. In certain circumstances, it may be desirable to heat the rolls uniformly circumferentially and across the machine direction to avoid thermally-induced crown or runout of the rolls. It has been found that, in the case of electrically heated rolls, a single heater failure can create enough runout to prevent uniform glue printing onto the web. Heat loss through bearings and roll shafts can create roll crown, which can also prevent uniform glue printing in certain embodiments. Thus, the roll's bearing blocks may be heated to prevent temperature gradients in the cross machine direction.

After the glue 26 is metered to the desired thickness, it is preferably transferred to the female embossing roll 16. The glue 26 then preferably remains on the surface of the roll 16 until it is transferred from female embossing roll 16 to the web 12. In certain preferred embodiments, the adhesive 26 is applied to the web 12 such that the adhesive 26 forms an adhesive pattern between the embossments of the web 12. Alternative embodiments are contemplated, however, wherein the adhesive 26 is applied to other locations on the web 12 and/or is applied continuously or randomly so as not to be in any particular pattern.

It is desirable to provide the adhesive 26 at a temperature or in a condition that allows for cohesive failure of the adhesive in the region where the adhesive/web combination is removed from the female roll 16 such that the glue transfers to the web 12 via glue splitting rather than peeling from the roll 16. For hot melt adhesives, this means keeping the adhesive at a temperature that allows for cohesive failure. For latex adhesives or adhesive that are water soluble or soluble in other solvents, this means maintaining the adhesive at a ratio of water or other solvent to adhesive such that adhesive will cohesively fail in the particular application. For embodiments including UV light cured adhesives and for electron beam cured adhesives that are all or substantially all solids, this means that the adhesive should be kept at a temperature that allows for cohesive failure. For UV and electron beam cured adhesives including a non-reactive carrier such as a solvent, the ratio of adhesive to solvent should be such that the adhesive cohesively fails for the particular use. In such embodiments, it may be useful to remove the solvent or carrier before the UV or electron beam curing takes place.

In embodiments wherein heat is used to provide the glue 26 in a condition for cohesive failure, the entire surface of the female roll 16 may be maintained at the desired temperature or the roll 16 may be zone heated to provide the desired result. If zone heated, it is generally preferred that the roll 16 be heated such that the adhesive 26 is at a temperature to allow for cohesive failure of the adhesive 26 in at least the region of the nip 30. Any known means for heating the roll may be used, including, but not limited to heaters that produce heat by convection, conduction, radiation or combinations thereof. Alternatively, the adhesive 26 may be heated by means other than the female roll 16 such as by the male roll, hot air, microwaves, sound, light, etc. or any other means, including, but not limited to heaters that produce heat by convection, conduction, radiation or combinations thereof. In any case, providing the adhesive at a temperature that allows for cohesive failure of the adhesive helps reduce the need for a release coating on the roll 16 or extend the life of a roll with or without a release coating or release surface.

In one particular embodiment of the present invention, the adhesive 26 is applied only to the land areas of the female embossing roll 16. This may be accomplished by carefully controlling the female embossing roll 16 to glue metering roll 18 clearance. Typically, in such embodiments, the glue metering rolls 18–22 may be ground to achieve approximately 0.0005–0.001 inches Total Indicated Runout ("TIR")

runout tolerance. Further, in such embodiments, the glue metering roll 18 is lightly pressed against the female embossing roll 16 such that the deflection of the surface compensates for embossing roll 16 and glue application roll runout, but the deflection is not so high as to press glue 26 into the pockets in the surface of the female embossing roll 16. Deposition of glue 26 only onto the lands of the female embossing roll 16 generally prevents glue from being transferred onto the tops of the embossments in the web 12.

The amount or degree of engagement between the male embossing roll 14 and the female embossing roll 16 may be controlled to help prevent damage to the rolls or to the web 12. In certain embodiments, it has been found to be preferable that the outside surfaces of the embossing rolls are ground to about 0.0005 inch TIR runout tolerance. The engagement of the embossing rolls typically influences the final caliper of the film (i.e., the final height of the embossments).

Another criteria to consider is the fit or correspondence between the male and female embossing rolls 14 and 16. One useful technique is to form one roll via a photoetching process and utilize this roll as a "master" to form the other roll as a negative image.

The surface of the embossing rolls 14 and 16 may be made of metal such as steel, chrome, aluminum, or nickel or made of polymeric or elastomeric materials such as rubber or polyurethane or any other suitable material. Further, the surface of the roll may be coated or plated with materials such as chrome, nickel or materials that reduce the surface energy of the roll with respect to the adhesive used in the process, such as silicone and/or fluorocarbons. The male 14 and female 16 embossing rolls may be constructed from the same material or different materials, depending on the desired outcome of the process.

After exiting the nip 30, the adhesive-coated web 12 may then travel to an S-wrap 28, or any other apparatus where it may be cooled to increase its strength or otherwise processed to add or modify the properties of the web. Further, in certain embodiments, the web 12 may be directed to a dryer, UV light source, electronic beam source or other equipment to cure or otherwise modify the adhesive properties of the adhesive 26. Additionally or alternatively, the web 12 may be directed to equipment that will wind, convert or package the web.

Figure 2:
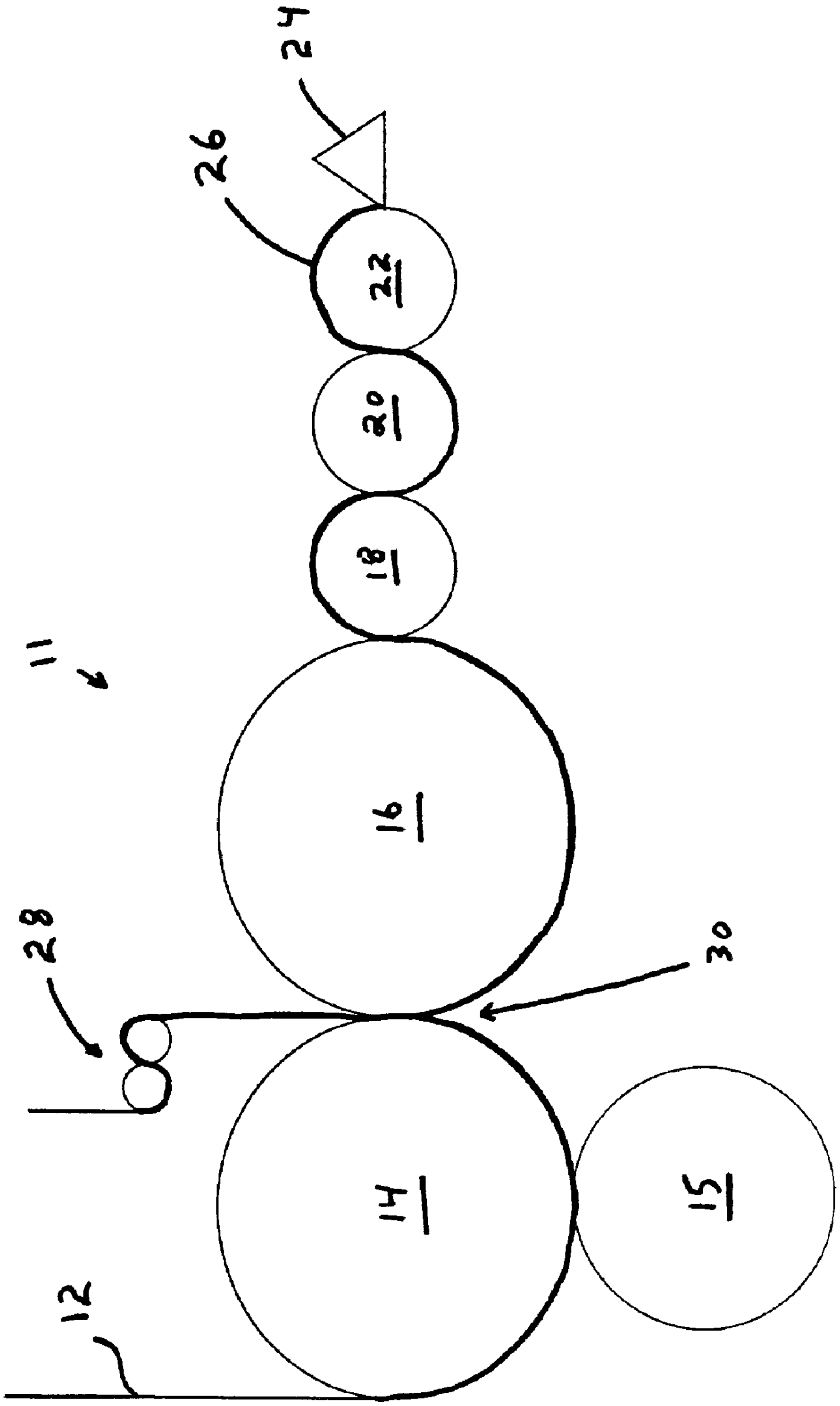
FIG. 2 is a schematic illustration of one alternative embodiment of the process and apparatus according to the present invention. In this embodiment, the web is pre-embossed prior to glue application.

FIG. 2 shows an alternative embodiment of the present invention. In this embodiment, the apparatus 11 is similar to the apparatus 10 of FIG. 1, but includes embossing roll 15 used to emboss the web 12 prior to adhesive application. In this case, rolls 14 and 16 are used to apply the adhesive to the embossed web 12. As with the apparatus of FIG. 1, it is desirable to provide the adhesive 26 at a temperature that provides for cohesive failure of the adhesive 26 in the region where the adhesive/web combination is removed from the female roll 16 such that the glue transfers to the web 12 via glue splitting rather than peeling from the roll 16. In one embodiment, at least a portion of the surface of the female embossing roll 16 of this embodiment may be maintained at a temperature in at least the region of the nip 30 such that the glue 26 transfers to the web 12 via glue splitting. Again, this may provide for longer life and less down time for the equipment, as compared to similar equipment coated with a release material that relies on the adhesive peeling away from the roll 16 upon exiting the nip 30.

Exemplary Food Wrap Embodiment

The method of the present invention may be used to manufacture many different types of articles and webs, including but not limited to food storage wraps. As used herein, the term "food storage wrap" refers to any flexible material that can be used to wrap, cover or contain food or other nutritional items for long or short term storage. In certain preferred embodiments, such food storage wraps may comply with FDA standards for direct and/or indirect contact with food or food packaging, however, other uses are contemplated (e.g. animal food storage). Examples of suitable food storage wrap materials include, but are not limited to paper, films (including, but not limited to polymeric films), wovens, nonwovens, laminates, foils, wax paper or other coated webs and combinations thereof.

Although the method of the present invention is generally described herein as including some sort of embossment or other means for providing the web with a three-dimensional structure, the method of the present invention may also be used to manufacture two-dimensional webs. Further, the method of the present invention may be used to provide two or three-dimensional web structures with patterned or non-patterned adhesive, intermittent or continuous adhesive on at least one surface thereof.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An embossing and adhesive application process, the process comprising the steps of:

(a) applying the adhesive to a first patterned embossing roll which is engaged with a second patterned embossing roll having a complementary pattern to the first embossing roll;

(b) passing a web of sheet material between the first and second embossing rolls at a tangential line speed to simultaneously emboss the web and direct the adhesive against the web; and (c) removing the web from the first patterned roll, wherein the adhesive cohesively fails and splits such that at least some of the adhesive remains on the first embossing roll and some of the adhesive remains on the web and forms an adhesive pattern between embossments on the web.

2. The process of claim 1, further comprising the steps of:

applying the adhesive to a glue metering roll;

milling the adhesive to a reduced thickness through a series of metering gaps between a plurality of adjacent glue rolls; and applying the adhesive to the glue application roll that applies the adhesive to the embossing roll.

3. The process of claim 1, wherein the adhesive is a hot melt adhesive, a latex adhesive, a water soluble adhesive, an adhesive soluble in a solvent, a UV light cured adhesive and/or an electron beam cured adhesive.

4. The process of claim 1 wherein the adhesive is heated or otherwise treated so as to provide the adhesive in a condition for cohesive failure just prior to the step of removing the web from the first patterned roll.

5. The process of claim 1, further comprising the step of cooling, drying or otherwise curing the adhesive after the embossing step.

6. The process of claim 1, wherein at least a portion of the first patterned embossing roll is heated to a temperature that provides for cohesive failure of the adhesive when the web is removed from the first patterned embossing roll.

7. The process of claim 1, further comprising the steps of:

applying an adhesive to a roll rotating at an initial tangential speed;

milling the adhesive to a reduced thickness and accelerating the adhesive through a series of metering gaps between a plurality of adjacent glue rolls; and applying the adhesive to the glue application roll rotating at the tangential line speed which is higher than the initial tangential speed.

8. The process of claim 1, wherein the adhesive is extruded from a slot die.

9. The process of claim 1, wherein the first patterned embossing roll is a female embossing roll and the second patterned embossing roll is a male embossing roll.

10. An embossing and adhesive application process, the process comprising the steps of:

(a) applying an adhesive to a glue application roll;

(b) transferring at least some of the adhesive from the glue application roll to a first patterned embossing roll which is engaged with a second patterned embossing roll having a complementary pattern to the first embossing roll, the first patterned roll having a predetermined surface temperature;

(c) passing a web of sheet material between the first and second embossing rolls at a tangential line speed to simultaneously emboss the web and direct the adhesive against the web;

(d) removing the web from the first patterned embossing roll, wherein the predetermined surface temperature of the first patterned embossing roll provides the adhesive at a temperature such that the adhesive cohesively fails and splits apart from itself such that at least some of the adhesive remains on the first embossing roll and some of the adhesive remains on the web and forms an adhesive pattern between embossments on the web; and (e) cooling the web to a temperature below the predetermined temperature of the patterned roll.

11. The process of claim 10, further comprising the steps of:

applying an adhesive to a glue metering roll;

milling the adhesive to a reduced thickness through a series of metering gaps between a plurality of adjacent glue rolls; and applying the adhesive to the glue application roll.

12. The process of claim 10, wherein the adhesive is a hot melt adhesive.

13. The process of claim 10, wherein at least a portion of the second patterned embossing roll is heated to a temperature that provides for cohesive failure of the adhesive when the web is removed from the first patterned embossing roll.

14. The process of claim 10, further comprising the steps of:

applying an adhesive to a roll rotating at an initial tangential speed;

milling the adhesive to a reduced thickness and accelerating the adhesive through a series of metering gaps between a plurality of adjacent glue rolls; and applying the adhesive to the glue application roll rotating at the tangential line speed which is higher than the initial tangential speed.

15. The process of claim 10, wherein the adhesive is extruded from a slot die.

16. The process of claim 10, wherein the first patterned embossing roll is a female embossing roll and the second patterned embossing roll is a male embossing roll.

17. An embossing and adhesive application process, the process comprising the steps of:

(a) applying the adhesive to an adhesive application roll;

(b) passing a web of sheet material between a first patterned embossing roll and a second patterned embossing roll, the first patterned embossing roll being engaged with the second patterned embossing roll and having a complementary pattern to the second embossing roll;

(c) contacting the web with the adhesive application roll;

(d) removing the web from the adhesive application roll, wherein the adhesive cohesively fails and splits such that at least some of the adhesive remains on the adhesive application roll and some of the adhesive remains on the web to form an adhesive pattern between embossments on the web.

18. A method of making an adhesive food storage wrap including the following steps:

(a) applying an adhesive to an adhesive application roll, the roll having an outer surface;

(b) contacting a web of sheet material to at least a portion of the outer surface of the adhesive application roll, wherein the adhesive is applied to the web in a predetermined pattern; and (c) removing the web from the adhesive application roll, wherein the adhesive cohesively fails and splits such that at least some of the adhesive remains on the adhesive application roll and some of the adhesive remains on the web.

19. The method of claim 18 wherein the web is embossed.

* * * * *